US012117097B2

(12) United States Patent
Sellen et al.

(10) Patent No.: US 12,117,097 B2
(45) Date of Patent: Oct. 15, 2024

(54) LEVER VALVE WITH SECURING HOOK

(71) Applicant: LUXEMBOURG PATENT COMPANY S.A., Lintgen (LU)

(72) Inventors: Stephan Sellen, Wehingen (DE); Georges Barthelemy, Schandel (LU); Philippe Schmitz, Steinsel (LU)

(73) Assignee: ROTAREX S.A., Lintgen (LU)

( * ) Notice: Subject to any disclaimer, the term of this patent is extended or adjusted under 35 U.S.C. 154(b) by 247 days.

(21) Appl. No.: 17/606,539

(22) PCT Filed: Apr. 24, 2020

(86) PCT No.: PCT/EP2020/061454
§ 371 (c)(1),
(2) Date: Oct. 26, 2021

(87) PCT Pub. No.: WO2020/216897
PCT Pub. Date: Oct. 29, 2020

(65) Prior Publication Data
US 2022/0178464 A1    Jun. 9, 2022

(30) Foreign Application Priority Data

Apr. 26, 2019   (LU) .................................. LU101208

(51) Int. Cl.
*F16K 35/02*   (2006.01)
*F16K 31/524*   (2006.01)
(52) U.S. Cl.
CPC ...... *F16K 35/025* (2013.01); *F16K 31/52408* (2013.01)
(58) Field of Classification Search
CPC .. F16K 35/025; F16K 31/52408; F16K 1/305; F16K 1/306; F16K 1/465;
(Continued)

(56) References Cited

U.S. PATENT DOCUMENTS 127,883 A * 6/1872 Hotz .................. F16K 35/025
251/107
1,318,120 A * 10/1919 Wheaton ............. F16K 35/025
137/614.19
(Continued)

FOREIGN PATENT DOCUMENTS

FR   3056277 A1   3/2018
FR   3056278 A1   3/2018
(Continued)

OTHER PUBLICATIONS

International Search Report for PCT/EP2020/061454 mailed Jun. 4, 2020.
Written Opinion for PCT/EP2020/061454 mailed Jun. 4, 2020.

*Primary Examiner* — Craig J Price
(74) *Attorney, Agent, or Firm* — Sandberg Phoenix & von Gontard PC

(57) ABSTRACT

A valve for compressed gas, comprising a body extending longitudinally, with a gas inlet at a lower end of the body, a gas outlet and a gas passage fluidly interconnecting the gas inlet and the gas outlet; a shut-off device housed in the body and configured for selectively shutting-off and opening the gas passage; a lever pivotally mounted on the body, at an upper end of the body, and configured for actuating the shut-off device; a hook pivotally mounted on the lever for engaging with a counter-shape on the body and thereby holding the lever in a folded position along the body; wherein the upper end of the body comprises a cylindrical wall delimiting an upper bore, the counter-shape being an upper edge of the cylindrical wall.

17 Claims, 2 Drawing Sheets

(58) Field of Classification Search
CPC ........ F16K 1/30; F16K 1/304; F16K 37/0008; F16K 31/602; F17C 13/04; F17C 2201/056; F17C 2227/048; F17C 2205/0385; F17C 2205/0332; F17C 2205/0329; F17C 2201/058; F17C 2205/0314; F17C 2250/0439; F17C 2205/0394; F17C 2201/032; F17C 2250/043; F17C 2260/01; F17C 2201/0104; F17C 2223/035; F17C 2223/0123; F17C 2250/0491; F17C 2270/0745; F17C 13/123; F17C 2201/0109; F17C 2250/0408; F17C 2205/0308; F17C 2205/0338; F17C 5/06; F17C 2201/05; F17C 2223/036; Y10T 137/71; Y10T 137/8158; Y10T 137/8326
USPC ............................. 251/109, 231, 262, 263; 137/614.16–614.18, 877, 878, 881, 137/614.19, 315.37

See application file for complete search history.

(56) References Cited

U.S. PATENT DOCUMENTS

| | | | | |
|---|---|---|---|---|
| 1,796,840 | A * | 3/1931 | Green | F16K 35/025 251/109 |
| 2,038,508 | A * | 4/1936 | Elliott | F16N 5/02 251/114 |
| 2,147,287 | A * | 2/1939 | Farmer | B60T 17/043 251/285 |
| 2,213,878 | A * | 9/1940 | Boyle | F16K 13/04 137/384 |
| 2,271,785 | A * | 2/1942 | Watkins | F16K 1/303 251/263 |
| 2,280,549 | A * | 4/1942 | Smickle | F16K 35/025 251/109 |
| 2,972,466 | A * | 2/1961 | Allen | F16K 17/00 251/35 |
| 3,031,165 | A * | 4/1962 | Allen | F16K 1/307 137/557 |
| 3,035,605 | A * | 5/1962 | Ninnelt | F16K 35/00 251/111 |
| 3,419,246 | A * | 12/1968 | Burgess | F16K 1/38 251/285 |
| 4,016,684 | A * | 4/1977 | Urda | F16P 3/00 251/109 |
| 4,018,292 | A * | 4/1977 | Roll | B25B 21/00 251/109 |
| 4,747,427 | A * | 5/1988 | Smith | F16K 5/0647 251/288 |
| 5,215,120 | A * | 6/1993 | Nimberger | F16K 1/443 137/614.19 |
| 5,404,909 | A * | 4/1995 | Hanson | F16L 37/252 62/50.7 |
| 5,465,754 | A * | 11/1995 | Sudo | F16K 1/305 137/614.19 |
| 5,598,724 | A * | 2/1997 | Primeau | F16K 35/06 70/180 |
| 5,836,352 | A * | 11/1998 | Nimberger | F16K 1/443 137/614.19 |
| 5,975,121 | A * | 11/1999 | Arzenton | F17C 13/06 137/557 |
| 6,032,922 | A * | 3/2000 | Shew | F16K 31/52433 251/243 |
| 6,086,045 | A * | 7/2000 | Moon | F16K 35/025 251/114 |
| 6,367,775 | B1 * | 4/2002 | Nimberger | F16K 35/025 251/109 |
| 6,386,248 | B2 * | 5/2002 | Johnston | F17C 13/06 141/386 |
| 8,056,580 | B2 * | 11/2011 | Lang | F16K 1/306 251/98 |
| 8,156,961 | B2 * | 4/2012 | Denis | F17C 13/04 137/614.19 |
| 8,851,446 | B2 * | 10/2014 | Nimberger | F16K 31/52408 251/107 |
| 8,863,791 | B2 * | 10/2014 | Aehle | F17C 5/02 141/348 |
| 8,939,170 | B2 * | 1/2015 | Ligonesche | F17C 13/04 137/557 |
| 8,955,823 | B2 * | 2/2015 | Nimberger | F16L 29/007 285/317 |
| 8,991,418 | B2 * | 3/2015 | Lin | F16K 1/307 137/893 |
| 9,328,834 | B2 * | 5/2016 | Wang | F04B 33/005 |
| 9,422,145 | B2 * | 8/2016 | Wang | B67D 3/0029 |
| 9,969,605 | B2 * | 5/2018 | Geipel | B67D 7/42 |
| 10,011,472 | B2 * | 7/2018 | Myung | B67D 1/0082 |
| 10,759,653 | B1 * | 9/2020 | Jasek | B65D 47/283 |
| 11,118,737 | B2 * | 9/2021 | Stephan | F17C 13/04 |
| 11,313,490 | B2 * | 4/2022 | Vignerol | F17C 13/04 |
| 11,346,462 | B2 * | 5/2022 | Vignerol | F16K 1/304 |
| 11,927,308 | B2 * | 3/2024 | Sellen | F16K 17/30 |
| 2005/0173007 | A1 * | 8/2005 | Cannet | F16K 1/306 137/557 |
| 2008/0128034 | A1 * | 6/2008 | Fahl | F16L 37/44 137/614.06 |
| 2020/0300371 | A1 * | 9/2020 | Vignerol | F16K 31/52408 |
| 2022/0282836 | A1 * | 9/2022 | Sellen | F16K 17/30 |
| 2022/0290819 | A1 * | 9/2022 | Sellen | F17C 13/04 |

FOREIGN PATENT DOCUMENTS

| | | |
|---|---|---|
| FR | 3072152 A1 | 4/2019 |
| GB | 2528920 A | 2/2016 |
| WO | 2019068976 A1 | 4/2019 |

\* cited by examiner

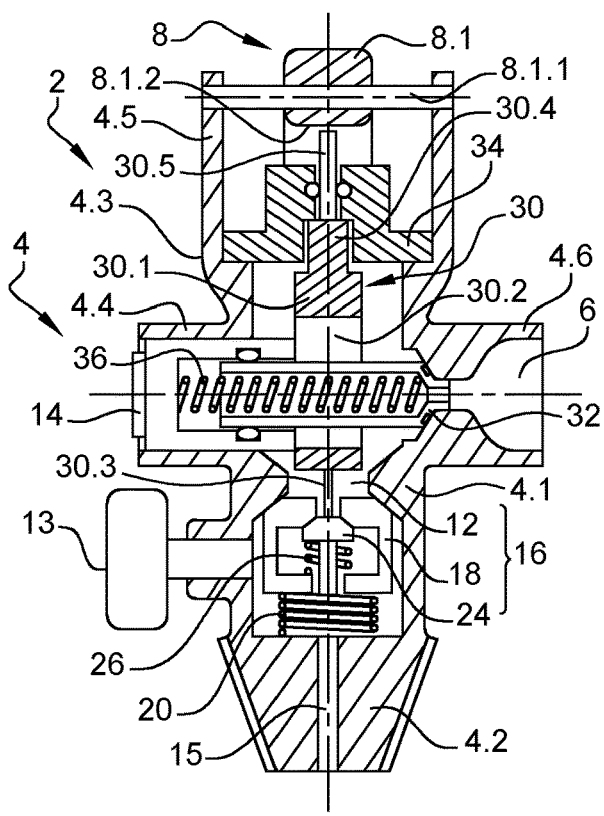

LEVER VALVE WITH SECURING HOOK

CROSS-REFERENCE TO RELATED APPLICATIONS

The present invention is the US national stage under 35 U.S.C. § 371 of International Application No. PCT/EP2020/061454 which was filed on Apr. 24, 2020, and which claims the priority of application LU 101208 filed on Apr. 26, 2019, the content of which (text, drawings and claims) are incorporated here by reference in its entirety.

FIELD

The invention is directed to the field of valves for compressed gas, more particularly for gas cylinders.

BACKGROUND

The use of levers for actuating valves for compressed gas, in particular to be mounted on necks of gas cylinders, is well known since many years.

Prior art patent document published U.S. Pat. No. 3,035,605, dated 1958, already disclose the use of a lever for operating a gas cylinder valve. The lever is pivotally mounted on a cap that is rigidly attached to the gas cylinder and that covers the valve. The lever is generally L-shaped with a first portion that is generally horizontal and a second portion that is generally vertical when the lever is in a folded position, i.e., close to the valve and cover. The first portion has a distal end with a cam pivotally mounted to the cover. The cam contacts a tappet on the top of the valve. The tappet is configured to translate along the vertical and longitudinal axis of the valve and move a stem that extends through a valve seat for contacting and moving a closure element normally resting on the seat. The second portion of the lever comprises a lower end that is bifurcated, i.e., that shows two prongs configured for sliding along an outlet nipple so that they are retained in that position when a closing nut is screwed on the outlet nipple. This provides a basic securing means for the lever in the closed folded position.

Prior art document published CA 2,178,573 A1 discloses a lever valve for gas cylinders where the lever is pivotally mounted on the top of the valve body. The cam portion of the lever shows recesses that engage with a leaf spring showing a corresponding protruding portion. This provides two resting positions for the lever, one where the lever is folded and the valve is closed and another one where the lever is lifted and the valve is open, which is intended to be not sensitive to the vibrations like those occurring during transport. The leaf spring is however subject to damages, also dirt can accumulate on the recesses and the leaf spring, potentially impairing a proper functioning.

Prior art document published FR 2 793 297 A1 discloses a lever valve for gas cylinder where the lever comprises a hook for engaging with a counter-shaped on the valve body, for securing the lever in a folded position, corresponding to a closed position of the valve. The counter-shape on the body is however a protruding rod-shaped element that needs to be fastened to the body. Also, the ergonomics shows limitations in that the portion of lever that a user can grip when actuating the hook for lifting the lever is short and close to horizontal.

SUMMARY

The invention has for technical problem to overcome at least one of the drawbacks of the above cited prior art. More specifically, the invention has for technical problem to provide a lever valve with securing means for the lever that can be easily operated, provide a satisfying level of security and is cheap to manufacture.

The invention is directed to a valve for compressed gas, comprising a body extending longitudinally, with a gas inlet at a lower end of the body, a gas outlet and a gas passage fluidly interconnecting the gas inlet and the gas outlet; a shut-off device housed in the body and configured for selectively shutting-off and opening the gas passage; a lever pivotally mounted on the body, at an upper end of the body, and configured for actuating the shut-off device; a hook pivotally mounted on the lever for engaging with a counter-shape on the body and thereby holding the lever in a folded position along the body; wherein the upper end of the body comprises a cylindrical wall delimiting an upper bore, the counter-shape being an upper edge of the cylindrical wall.

According to an exemplary embodiment, the valve comprises a longitudinally movable member configured for transmitting an actuating movement of the lever to the shut-off device, and a guiding element housed in the upper bore and through which an upper portion of the longitudinally extending movable member extends for contacting the lever.

According to an exemplary embodiment, the guiding element is secured in the upper bore by engagement with an inner thread in the upper bore.

According to an exemplary embodiment, the guiding element shows an upper face with an outer circular area sunk in the upper bore by at least 0.5 mm and/or not more than 3 mm relative to the upper edge of the cylindrical wall.

According to an exemplary embodiment, the shut-off device comprises a main seat surrounding the gas passage, a main closure element upstream of the main seat, a first elastic element resting on the body and urging the main closure element towards the main seat, a pilot closure element housed in the main closure element, a second elastic element resting on the main closure element and urging the pilot closure element against a pilot seat, the longitudinally movable member being configured for pressing the pilot closure element away from the pilot seat upon actuation of the lever.

According to an exemplary embodiment, the shut-off device is configured such that, upon actuation of the lever, first the pilot closure element opens the gas passage with a reduced cross-section and second the main closure element moves away from the main seat once a counter-pressure has built up downstream of the main seat.

According to an exemplary embodiment, the longitudinally movable member comprises a main portion, a lower pin for cooperating with the shut-off device and an upper stem for cooperating with the lever.

According to an exemplary embodiment, the main portion of the longitudinally movable member comprises an oblong aperture crossed by a transversal piston of an auxiliary function, like a Residual Pressure Valve or a pressure reducer.

According to an exemplary embodiment, the body further comprises two brackets extending in a diametrically opposed manner from the cylindrical wall, the brackets pivotally supporting the lever.

According to an exemplary embodiment, each of the two brackets show a width that reduces upwardly and a circular cross-section corresponding to the cylindrical wall.

According to an exemplary embodiment, the hook is pivotally mounted on an upper half portion of the lever when the lever is in the folded position.

According to an exemplary embodiment, the lever is L-shaped with an upper portion horizontal portion and a lower vertical portion when the lever is in the folded position, the lower vertical portion comprising an upper sub-portion, a lower sub-portion and a S-shaped intermediate sub-portion such that the lower sub-portion is more distant from the body than the upper sub-portion.

According to an exemplary embodiment, the hook is pivotally mounted on the upper sub-portion of the lower vertical portion of the lever, and comprises a press area on an outer side of the upper sub-portion.

According to an exemplary embodiment, a resilient member is provided between the hook and the lever for urging the hook in a position engaging with the counter-shape on the body, the hook and the lever comprising mutually abutting surfaces limiting a pivoting movement of the hook in the engaging position such that the hook automatically engages with the counter-shape on the body when the lever is pivoted back to the folded position while releasing the hook.

According to an exemplary embodiment, the hook comprises a front rib for engaging the counter-shape on the body, a rear press portion and two side walls interconnecting the rear press portion with the front rib and pivotally mounted on the lever. Advantageously, the front rib is curved so as to match to profile of the cylindrical wall.

The invention is particularly interesting in that it provides a securing means for a lever valve that provides a good level of security while being easy to handle and cheap to produce. Indeed, no additional element needs to be attached to the body for forming the engagement counter-shape of the hook. The body of the valve can be made by forging and thereafter by machining. The counter-shape at the upper edge of the cylindrical wall can be directly obtained by the forging operation, meaning that it requires no additional manufacturing step. The brackets supporting the lever further increase the manufacturing cost optimization in that these can also be obtained during the forging operation, requiring, if any, limited machining operations. Also, the position of the hook at a higher position is interesting on a handling point of view, essentially because the remaining lower portion of the lever remains available for being grasped and pulled by the hand of the operator.

DRAWINGS

FIG. 3 is a schematic sectional view of the valve of FIG. 1, in a longitudinal plane perpendicular to the lever, i.e., passing by the pivoting axis of the lever, according to various embodiments of the invention.

FIG. 4 is a schematic sectional view of the valve of FIG. 1, corresponding to FIG. 2 where however the lever is lifted and the valve is open, according to various embodiments of the invention.

DETAILED DESCRIPTION

Figure 1:
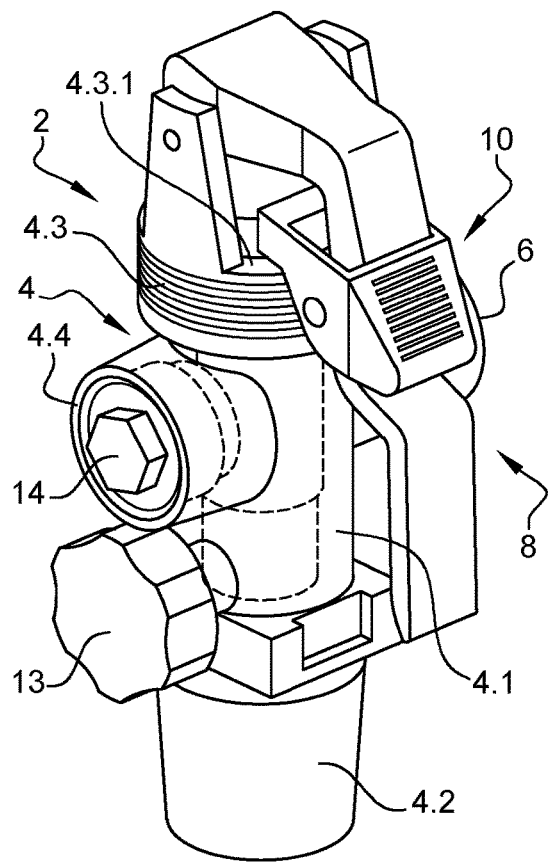
FIG. 1 is a perspective view of a valve for compressed gas, according to various embodiments of the invention.
Figure 2:
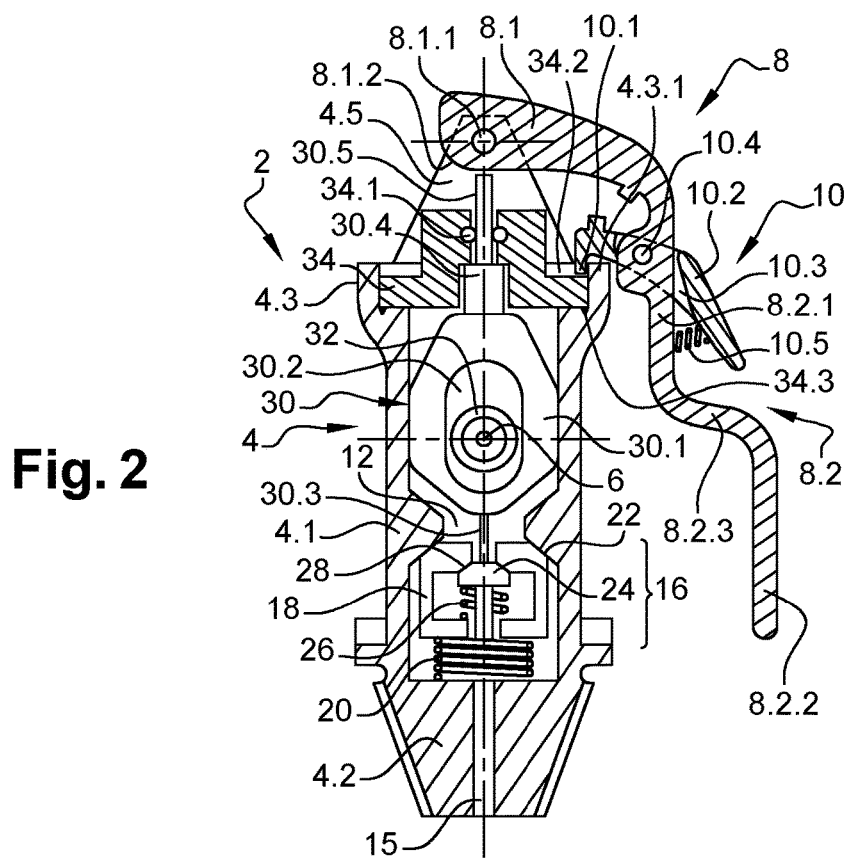
FIG. 2 is a schematic sectional view of the valve of FIG. 1, in a longitudinal plane along the lever, i.e., perpendicular to the pivoting axis of the lever, according to various embodiments of the invention.

FIGS. 1 to 3 illustrate a lever valve for compressed gas according to the invention, a closed state whereas FIG. 4 illustrates the same valve in an open state.

FIG. 1 is a perspective view of the valve according to the invention. The valve 2 is for instance a gas cylinder valve being however understood that this must not necessarily be the case, i.e., the valve could be mounted differently, i.e., in a different configuration. The valve 2 comprises a body 4 that extends along a longitudinal direction that is for instance vertical. The body 4 comprises a central portion 4.1, a lower end portion 4.2 with a gas inlet and for instance with an outer tapered thread for engaging with a corresponding female thread on a neck of a gas cylinder, and an upper portion 4.3 that forms a cylindrical wall.

The valve 2 comprises inside the body 4 a gas passage interconnecting the gas inlet at the lower end portion 4.2 with a gas outlet 6, and a shut-off device of the gas passage. These will be described in connection with section sectional views in FIGS. 2 to 4. The shut-off device is actuated by the lever 8 that is pivotally mounted on the body 4, for instance to two brackets that extend upwardly from the upper portion 4.3 of the body 4. A hook 10 is provided on the lever 8 for engaging with the body 4, more particularly with an upper edge of the cylindrical wall on the upper portion 4.3 of the body 4.

In the configuration in FIG. 1, the lever 8 is folded on the body 4 and closes the gas passage. For opening the gas passage, the lever 8 need to be operated by lifting the lever. To that end, the hook 10 that engages with an upper edge 4.3.1 of the cylindrical wall 4.3 of the body 4 needs to be operated for disengaging from the body 4. Thereafter the lever 8 can be lifted for allowing a gas passage.

Still with reference with FIG. 1, the valve 2 comprises in addition a pressure gauge 13 screwed at a lower position in the central portion 4.1 of the body 4, for measuring the pressure at the inlet. The valve comprises also a plug 14 engaged in a transversal bore portion 4.4 of the body 4, on the main body portion 4.1. This bore portion 4.4 and the plug 14 house a Residual Pressure Valve (RPV) that will be detailed in connection with FIG. 3. The pressure gauge and the RPV are optional. Also the RPV can be replaced by another function like for example a pressure reducer.

FIGS. 2 and 3 are schematic sectional views of the valve of FIG. 1. In FIG. 2, the section is in a longitudinal plane along the lever, i.e., perpendicular to the pivoting axis of the lever, whereas in FIG. 3 the section is perpendicular to the section of FIG. 2, for instance passing by the pivoting axis of the lever.

As this is apparent, the body 4 comprises a gas passage 12 that fluidly interconnects a gas inlet 15 with the gas outlet 6. A shut-off device 16 is provided in the body 4, more particularly in the gas passage 12. The shut-off device 16 comprises essentially a main closure element 18 that is mobile and urged by a first spring 20 against a main seat 22 surrounding the gas passage 12. The shut-off device 16 comprises also a pilot closure element 24 that is housed in the main closure element and urged by a second spring 26 resting against the main closure element towards a pilot seat 28 that is for instance formed on the main closure element 18. Both main and pilot closure elements 18 and 24 are located upstream of the main seat 22, i.e., on a side therefore that is on the gas inlet side. Both first and second springs 20 and 26 urge the closure elements towards their respective seats and tend to close the passage. The pressure on the inlet side exerts on the closure elements 18 and 24 additional forces pressing them against their respective seats 22 and 28.

The body 4 is schematically represented in that for mounting the above elements and springs of the shut-off device, the body needs to be in two separate parts that would be assembled thereafter. Alternatively, the main seat 22 can be distinct from the body 4 so as to be mounted on the body, in which case all elements and springs of the shut-off device would be inserted in the body 4 from above.

The valve 2 comprises also a longitudinally movable member 30 configured for transmitting an actuating movement of the lever 8 to the shut-off device 16. More specifically, the longitudinally movable member 30 is configured for contacting at an upper end a cam profile of the lever and for contacting at a lower end the pilot closure element 24 of the shut-off device 16. For instance, the longitudinally movable member 30 comprises a main portion 30.1 slidingly received in the body 4, a lower pin 30.3 that can extend through the main seat 22 and contact the pilot closure element 24, an upper stem 30.5 with an upper end cooperating with the lever 8. For instance, the main portion 30.1 comprises a longitudinally oblong aperture 30.2 that is crossed by a piston 32 of the above mentioned RPV (Residual Pressure Valve). The rear portion of the piston 32 is slidingly received in gas tight fashion in a bore formed in the plug 14 engaging in the bore portion 4.4 of the body 4. The front portion of the piston 32 cooperates in a gas tight fashion with a corresponding seat in the gas passage 12, aligned with the gas outlet 6 formed in a sleeve portion 4.6 of the body 4. Also, the longitudinally movable member 30 can comprise an intermediate portion 30.4 between the upper stem 30.5 and the main portion 30.1, guided by a corresponding bore formed in a guiding element 34. The latter is housed in an upper bore formed in the upper portion 4.3 of the body 4 and delimited by the cylindrical wall of the upper portion 4.3. The guiding element 34 comprises an inner bore extending there through and receiving in a gas tight fashion the upper stem 30.5 of the longitudinally movable member 30. The guiding element 34 comprises an upper and outer face with an outer annular portion 34.2 that is lowered or sunk compared with the upper edge of the cylindrical wall 4.3, so as to provide space for engagement of the hook with the edge. This lowering is of at least 0.5 mm and in various instances not more than 3 mm. The guiding element 34 forms a plug or lid that closes in a gas tight fashion the cavity in the body housing the longitudinally movable member 30 and forming the gas passage 12. The guiding element 34 can be secured by a threaded engagement with a female thread in the upper bore. For instance, the guiding element 34 shows an outer thread that achieves that engagement, being however understood that other means for securing that element are conceivable, e.g., a threaded lock ring can be engaged with the female thread in the upper bore, for pressing the guiding element downwardly. As this is apparent, the upper bore forms a shoulder on which a lower face of the guiding element 34 abuts. For providing a gas tight connection, that lower face can show a circular rib 34.3 that plastically deforms in contact with the shoulder.

As already mentioned above, the cylindrical wall 4.3 shows two brackets 4.5 extending upwardly and in a radially opposite manner. These two brackets 4.5 support the pivot axis of the lever 8. They can show a width that progressively reduces upwardly.

The lever 8 is generally L-shaped and comprises a first portion 1 that is generally horizontal and a second portion 8.2 that is generally vertical, both when the lever is in the illustrated folded position. The first portion comprises an end portion with the pivoting axis 8.1.1 and the cam profile 8.1.2 for cooperating with the longitudinally movable member 30 for selectively opening and closing the shut-off device 16. The second portion 8.2 of the lever comprises an upper sub-portion 8.2.1, a lower sub-portion 8.2.2 and an S-shaped intermediate sub-portion 8.2.3 interconnecting the upper and lower sub-portions such that the lower sub-portion is more distant from the body than the upper sub-portion. The hook 10 is pivotally mounted on the upper sub-portion 8.2.1 of the second portion 8.2 of the lever 8.

The hook 10 comprises a front rib 10.1 for engaging the upper edge 4.3.1 of the cylindrical wall 4.3 on the body 4, a rear press portion 10.2 and two side walls 10.3 interconnecting the rear press portion 10.2 with the front rib 10.1. The side walls 10.3 support the pivoting axis 10.4 extending through the lever, in particular, the upper sub-portion 8.2.1 of the second portion 8.2 of the lever 8. A spring 10.5 can be provided between the hook 10 and the lever 8, resiliently urging the hook towards an engagement position with the counter-shape on the body 4. For instance, the spring 10.5 can be a compression spring located between an outer face of the lever 8 and an inner face of the rear press portion 10.2. The ends of the spring can be housed in deepenings formed in each of the lever and the hook.

In the configuration of FIGS. 2 and 3, the shut-off device 16 is in a closed state, i.e., the gas passage 12 is shut-off by both main and pilot closure elements 18 and 24, urged by the first and second springs 20 and 26 and also by the gas pressure on the gas inlet side. At least one of the lower pin 30.3 and the upper stem 30.5 of the longitudinally movable member 30 is off the pilot closure element 24 and the cam profile 8.1.2 of the lever, respectively, so as to ensure a proper shut-off of the gas passage 12.

FIG. 4 is a schematic section view of the valve of FIG. 1, corresponding to FIG. 2, where however the lever is lifted for opening the gas passage. This lifted position can be an intermediate position in that the lever can be further lifted but with no or little influence on the shut-off device.

For lifting the lever 8, an operator needs to operate the hook 10 by exerting a pressure on the press area of the rear press portion 10.3 for pivoting the hook about the pivot axis 10.4, for instance in the clockwise direction, so that the front rib 10.1 disengages from the upper edge of the cylindrical wall 4.3 of the body 4. The operator can then pull on the lever 8, for instance on the second portion 8.2 and in various instances on the lower sub-portion 8.2.2. The rotation of the lever 8 has for effect to move the cam profile 8.1.2 about the pivot axis 8.1.1 of the lever and along the upper stem 30.5 of the longitudinally movable member 30, thereby increasing the diameter of the profile and pushing the upper stem 30.5 and more generally the whole longitudinally movable member 30 downwardly so that the lower pin 30.3 moves the pilot closure element 24 off the pilot seat 28, opening a first reduced gas passage. The gas under high-pressure on the gas inlet side flows through the pilot seat 28 so that, provided that a gas consuming device in a closed position (i.e., not consuming gas or at least consuming less than nominal consumption) is fluidly connected to the gas outlet, a counter-pressure will build up directly downstream of the pilot seat 28. The resulting force exerted by the first spring 20 and the gas pressure on the main closure element 18 progressively diminishes by virtue of the counter-pressure, up to a point where this force become less than the opposing force exerted by the second spring 26 on the main closure element 18. The latter will then progressively move away from the main seat 22, thereby opening a second main gas passage, against the force of the first spring 20. This thereby provides a progressive opening of the gas passage 12, even when the lever 8 is rapidly lifted as illustrated.

The lever 8, for instance the second portion 8.2 thereof, in various instances the upper sub-portion 8.2.1 thereof, shows an abutting surface 8.2.1.1 that is contacted by a corresponding surface of the hook 10 once the hook is released from an operating force by the operator and moves back to an engaging position by a spring element operating between the lever 8 and the hook 10. These surfaces and the front surface of the front rib 10.1 are in various instances configured such that when moving the lever 8 back to the folded portion, the front surface will slide along the upper edge of the cylindrical wall 4.3, pivot about its axis 10.4 and then reengage with the upper edge.

What is claimed is:

1. A valve for compressed gas, said valve comprising:
   a body extending longitudinally, with a gas inlet at a lower end of the body, a gas outlet and a gas passage fluidly interconnecting gas inlet and gas outlet;
   a shut-off device housed in the body and configured for selectively shutting-off and opening the gas passage;
   a lever pivotally mounted on the body, at an upper end of body, and configured for actuating the shut-off device;
   a hook pivotally mounted on the lever for engaging with a counter-shape on the body and thereby holding the lever in a folded position along the body;
   wherein the upper end of the body comprises a cylindrical wall delimiting an upper bore, the counter-shape being an upper free edge of the cylindrical wall.

2. The valve according to claim 1, wherein the valve comprises a longitudinally movable member configured for transmitting an actuating movement of the lever to the shut-off device, and a guiding element housed in the upper bore and through which an upper portion of the longitudinally extending movable member extends for contacting the lever.

3. The valve according to claim 2, wherein the guiding element is secured in the upper bore by engagement with an inner thread in the upper bore.

4. The valve according to claim 2, wherein the guiding element shows an upper face with an outer circular area sunk in the upper bore by at least 0.5 mm and not more than 3 mm relative to the upper edge of the cylindrical wall.

5. The valve according to claim 2, wherein the shut-off device comprises a main seat surrounding the gas passage, a main closure element upstream of the main seat, a first elastic element resting on the body and urging the main closure element towards the main seat, a pilot closure element housed in the main closure element, a second elastic element resting on the main closure element and urging the pilot closure element against a pilot seat, the longitudinally movable member being configured for pressing the pilot closure element away from the pilot seat upon actuation of the lever.

6. The valve according to claim 5, wherein the shut-off device is configured such that, upon actuation of the lever, first the pilot closure element opens the gas passage with a reduced cross-section and second the main closure element moves away from the main seat once a counter-pressure has built up downstream of the main seat.

7. The valve according to claim 2, wherein the longitudinally movable member comprises a main portion, a lower pin for cooperating with the shut-off device and an upper stem for cooperating with the lever.

8. The valve according to claim 7, wherein the main portion of the longitudinally movable member comprises an oblong aperture crossed by a transversal piston of an auxiliary function selected among a Residual Pressure Valve or a pressure reducer.

9. The valve according to claim 1, wherein the body further comprises two brackets extending in a diametrically opposed manner from the cylindrical wall, the brackets pivotally supporting the lever.

10. The valve according to claim 9, wherein each of the two brackets have a width that reduces upwardly and a circular cross-section corresponding to the cylindrical wall.

11. The valve according to claim 1, wherein the hook is pivotally mounted on an upper half portion of the lever when the lever is in the folded position.

12. The valve according to claim 1, wherein the lever is L-shaped with an upper horizontal portion and a lower vertical portion when lever is in the folded position, the lower vertical portion comprising an upper sub-portion, a lower sub-portion and a S-shaped intermediate sub-portion such that the lower sub-portion is more distant from the body than the upper sub-portion.

13. The valve according to claim 12, wherein the hook is pivotally mounted on the upper sub-portion of the lower vertical portion of the lever, and comprises a press area on an outer side of the upper sub-portion.

14. The valve according to claim 1, wherein a resilient member is provided between the hook and the lever for urging hook in a position engaging with the counter-shape on the body, the hook and the lever comprising mutually abutting surfaces limiting a pivoting movement of hook in the engaging position such that the hook automatically engages with the counter-shape on the body when the lever is pivoted back to the folded position while releasing the hook.

15. The valve according to claim 1, wherein the hook comprises a front rib for engaging the counter-shape on the body, a rear press portion and two side walls interconnecting the rear press portion with the front rib and pivotally mounted on the lever.

16. A valve for compressed gas, said valve comprising:
   a body extending longitudinally, with a gas inlet at a lower end of the body, a gas outlet and a gas passage fluidly interconnecting the gas inlet and the gas outlet;
   a shut-off device housed in the body and configured for selectively shutting-off and opening the gas passage;
   a lever pivotally mounted on the body, at an upper end of body, and configured for actuating the shut-off device;
   a hook pivotally mounted on the lever for engaging with a counter-shape on the body and thereby holding the lever in a folded position along the body;
   wherein the upper end of the body comprises a cylindrical wall delimiting an upper bore, the counter-shape being an upper edge of the cylindrical wall;
   wherein the valve comprises a longitudinally movable member configured for transmitting an actuating movement of the lever to the shut-off device, and a guiding element housed in the upper bore and through which an upper portion of the longitudinally extending movable member extends for contacting the lever; and
   wherein the guiding element shows an upper face with an outer circular area sunk in the upper bore by at least 0.5 mm and not more than 3 mm relative to the upper edge of the cylindrical wall.

17. A valve for compressed gas, said valve comprising:
   a body extending longitudinally, with a gas inlet at a lower end of the body, a gas outlet and a gas passage fluidly interconnecting gas inlet and gas outlet;
   a shut-off device housed in the body and configured for selectively shutting-off and opening the gas passage;
   a lever pivotally mounted on the body, at an upper end of body, and configured for actuating the shut-off device;
   a hook pivotally mounted on the lever for engaging with a counter-shape on the body and thereby holding the lever in a folded position along the body;

wherein the upper end of the body comprises a cylindrical wall delimiting an upper bore, the counter-shape being an upper edge of the cylindrical wall;

wherein the hook is pivotally mounted on an upper sub-portion of a lower vertical portion of the lever, and comprises a press area on an outer side of the upper sub-portion.

\* \* \* \* \*